US011486824B2

(12) United States Patent
Haiges et al.

(10) Patent No.: US 11,486,824 B2
(45) Date of Patent: Nov. 1, 2022

(54) SENSOR ARRANGEMENT

(71) Applicant: DEERE & COMPANY, Moline, IL (US)

(72) Inventors: Wolfram Haiges, Magstadt (DE); Dirk Jung, Zweibräœcken (DE); Florian Failer, Thanstein (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/302,513

(22) Filed: May 5, 2021

(65) Prior Publication Data
US 2021/0349014 A1 Nov. 11, 2021

(30) Foreign Application Priority Data
May 6, 2020 (DE) .......................... 102020205708.7

(51) Int. Cl.
*G01N 21/359* (2014.01)
(52) U.S. Cl.
CPC .................................. *G01N 21/359* (2013.01)
(58) Field of Classification Search
CPC combination set(s) only.
See application file for complete search history.

(56) References Cited

U.S. PATENT DOCUMENTS

| 5,452,082 A * | 9/1995 | Sanger ................... G01N 21/05 356/440 |
| 6,836,325 B2 | 12/2004 | Maczura et al. |
| 2018/0372619 A1* | 12/2018 | Hanst ................. G01N 21/0303 |
| 2019/0162593 A1* | 5/2019 | Kamikake ............. G01J 5/0875 |

FOREIGN PATENT DOCUMENTS

| CN | 103389274 A * | 11/2013 |
| DE | 102010047103 A1 | 3/2012 |
| EP | 0275059 A2 | 7/1988 |
| EP | 0779503 A2 | 6/1997 |
| EP | 3437451 B1 | 12/2020 |
| JP | 000S63177025 A | 7/1988 |
| JP | H05223635 A | 8/1993 |

* cited by examiner

*Primary Examiner* — Christine S. Kim
(74) *Attorney, Agent, or Firm* — Hanley, Flight & Zimmerman, LLC

(57) ABSTRACT

A sensor arrangement for evaluating agricultural material, the arrangement comprising: a housing having an opening, the opening configured with a window transparent to electromagnetic waves; a detector arranged in the housing for detecting electromagnetic waves coming in through the window; a flexible seal element disposed between the window and the housing; and a compression member proximate at least one of the opening, the housing, the window and the seal element, the compression member configured to press the window against the seal element to seal off the housing.

13 Claims, 4 Drawing Sheets

SENSOR ARRANGEMENT

RELATED APPLICATIONS

This document claims priority based on German Patent Application No. 102020205708.7, filed on May 6, 2020, which is hereby incorporated by reference into this application.

DESCRIPTION

This disclosure relates to a sensor arrangement for evaluating agricultural material, and more specifically a sensor arrangement using optical spectroscopy for evaluating agricultural material.

BACKGROUND

Measuring constituents by means of optical spectroscopy, in particular near infrared spectroscopy, is presently an established technology. It is used in many applications, for example in the food industry and in agriculture, for example to study the state of plants standing on a field, of constituents of harvested plant parts or of the composition of manure. There are also other optical measuring methods, for example Raman spectroscopy, in which (agricultural) materials are studied for constituents or other parameter.

In one example, an optical sensor arrangement is provided and which typically requires a window, through which electromagnetic waves, whether they are in the visible wavelength range or shorter or longer waves (ultraviolet or (near) infrared), can pass from the sample to be studied, which is positioned outside the housing, into the interior of the housing in order to be received there by detection elements of the sensor arrangement. The window simultaneously protects the interior of the sensor arrangement from the sample entering the interior and contaminating or destroying components of the sensor arrangement. In some types of sensors, the window is also used to illuminate the sample by means of a source for electromagnetic waves, which is arranged in the interior of the housing.

SUMMARY

A sensor arrangement for evaluating agricultural material, the arrangement comprising: a housing having an opening, the opening configured with a window transparent to electromagnetic waves; a detector arranged in the housing for detecting electromagnetic waves coming in through the window; a flexible seal element disposed between the window and the housing; and a compression member proximate at least one of the opening, the housing, the window and the seal element, the compression member configured to press the window against the seal element to seal off the housing.

In another example, a sensor arrangement for evaluating agricultural material, the arrangement comprising: a housing having an opening, the opening configured with a window transparent to electromagnetic waves; a detector arranged in the housing for detecting electromagnetic waves coming in through the window; a flexible seal element disposed between the window and the housing; a compression member proximate at least one of the housing, the opening, the window and the seal element, the compression member configured to press the window against the seal element to seal off the housing; and a temporary compression member proximate at least one of the opening, the window and the seal element, the temporary compression member configured to pretension the window against the seal element to seal off the housing.

DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
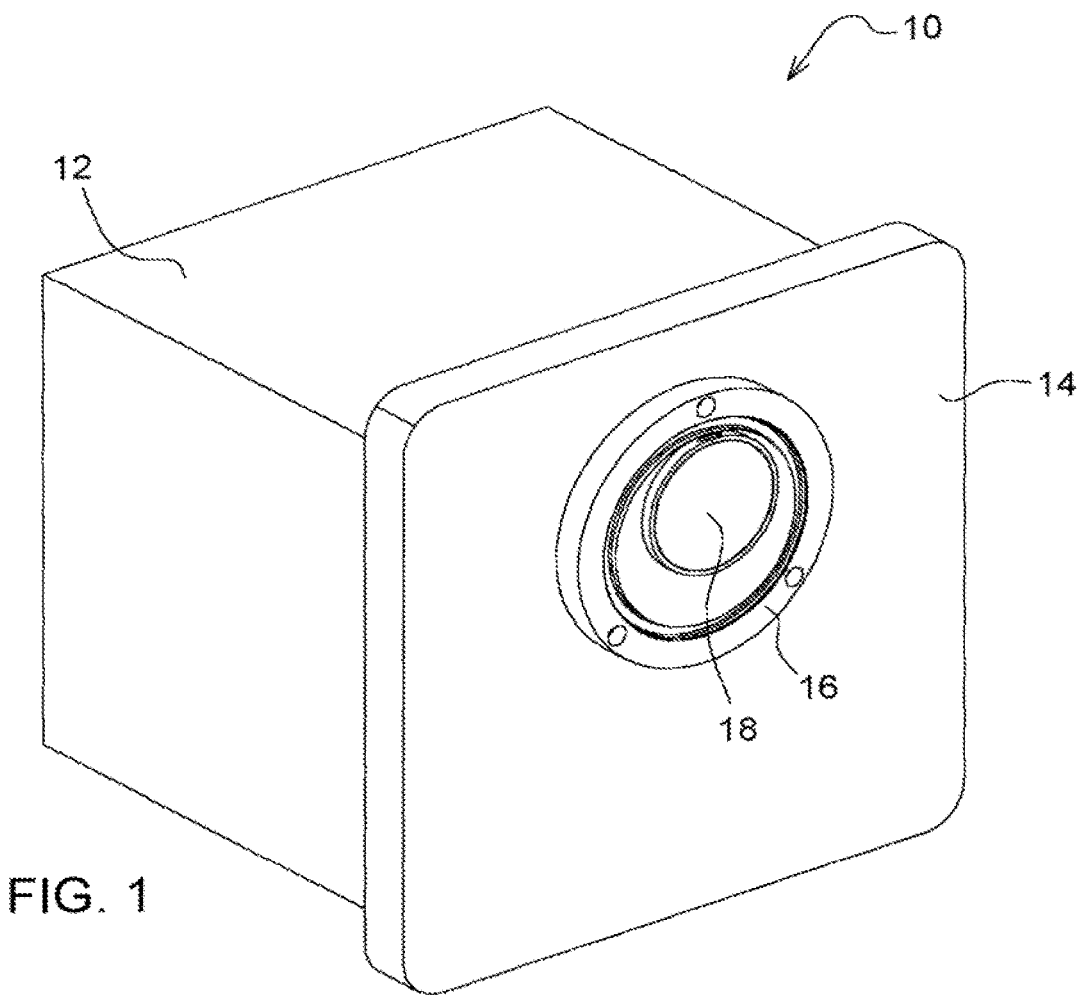
FIG. 1 shows a perspective view of a sensor arrangement.

Optical spectroscopy is used in many applications, for example in the food industry and in agriculture, for example to study the state of plants standing on a field, of constituents of harvested plant parts or of the composition of manure (see for example U.S. Pat. No. 6,836,325 B2). There are also other optical measuring methods, for example Raman spectroscopy, in which (agricultural) materials are studied for constituents or other parameters (European Patent No. 3 437 451 A1).

In one example, an optical sensor arrangement is provided and which typically requires a window, through which electromagnetic waves, whether they are in the visible wavelength range or shorter or longer waves (ultraviolet or (near) infrared), can pass from the sample to be studied, which is positioned outside the housing, into the interior of the housing in order to be received there by detection elements of the sensor arrangement. The window simultaneously protects the interior of the sensor arrangement from the sample entering the interior and contaminating or destroying components of the sensor arrangement. In some types of sensors, the window is also used to illuminate the sample with a source for electromagnetic waves, often arranged in the interior of the housing.

The window, which typically consists of quartz glass or sapphire glass in agricultural or food-industry applications, is thus to be fastened sufficiently strongly on the housing. In the some applications, the window is inserted into a matching recess of the housing on the outside of the housing, U.S. Pat. No. 6,836,325B2, and adhesively bonded there, Japan Patent No. 563177025A, or it is adhesively bonded on the inside of the housing, European Patent No. 0779503A2 (materially-bonded fixation). In the case of other optical sensors, the window is inserted into a groove of the housing, Japan Patent No. H05223635 A (form-fitting fixation), or a friction-locked fixation is carried out in that the window is inserted into an opening in the housing and pressed by a threaded ring against a flexible seal ring, which bears with its other surface on the housing, European Patent No. 0275059A2.

With respect to the materially bonded fixation by adhesive technology (U.S. Pat. No. 6,836,325B2, Japan Patent No. 563177025A, European Patent No. 0779503A2) has the disadvantage that the maximum forces and dynamic loads which this bond can withstand are limited. Furthermore, the long-term stability of the adhesive bond under the influence of a variety of environmental influences can only be estimated and ensured with difficulty. An assessment of the quality of the adhesive bond is only possible in a destructive manner, making it difficult to guarantee a consistent quality. The solely form-fitting connection according to Japan Patent No. H05223635A does not enable noteworthy sealing of the housing against liquids and in the case of the friction-locked connection according to European Patent No. 0275059A2 it is problematic to ensure that the seal ring is compressed with a suitable force, because this is dependent only on the torque with which the threaded ring is tightened and pressed against the window. During maintenance or repair work on the sensor arrangement, the risk therefore exists that the threaded ring will be tightened too tight and the window will shatter, or that it will be tightened too loose and a liquid sample will run out between the window and the insufficiently compressed seal ring.

In the present disclosure, the housing is sealed off against the surroundings at the interface between the housing and the window by the flexible seal element, while the window is pretensioned in a form-fitting manner against the seal element by the compression member 50. The previously described disadvantages are thus avoided, because the form-fitting nature enables better reproducibility of the positioning of the window in relation to the housing and the seal element—and thus also a better reproducible pressing force of the window against the seal element—than the friction-locked positioning of the window known, for example, according to European Patent No. 0275059A2. As a result, the desired sealing effect at the interface between the housing and the window is ensured even after repair and maintenance work.

The compression member 50 is form-fitting and/or removable from the window and/or from the housing to enable cleaning, repair, or a replacement of the window if necessary. For this purpose, it can be provided that the compression member 50 is removable and attachable while the window is pressed by another, temporary compression member 50 against the seal element, in order to pretension the window if necessary to a slightly greater extent against the housing than otherwise takes place due to the compression member 50, so that the latter has to absorb no or at least fewer forces than otherwise and therefore can be removed or attached more easily. A suitable tool can thus be provided, for example a type of screw clamp, which pretensions the window as temporary compression member 50 against the seal element and against the housing, in order to be able to remove and attach the compression member 50 otherwise used.

The compression member 50 can bear on the surface of the window spaced apart from the seal element or on the circumference of the window. In the first case, the compression member 50 can be embodied as any elements coupled to the housing which bear on the surface of the window that does not interact with the seal element, for example as a bolt or pivotable folding elements displaceable in the plane of the window. In the second case, the compression member 50 can interact with a feature formed on the circumference of the window, which can be a groove or a projection.

The compression member 50 can moreover interact in a form-fitting manner with a feature of the housing, wherein the feature of the housing can be a groove. The compression member 50 can be embodied as a wire in this case.

FIG. 1 shows a perspective view of a sensor arrangement 10. It comprises an approximately cuboid housing 12, which can be provided with lateral cooling ribs (not shown), and a front plate 14, on which a flange 16 is attached. The flange 16 surrounds an opening in the housing 12, which is closed to the outside by a window 18 (forming a pane sufficiently transmissive to electromagnetic waves in the wavelength range to be studied). The window 18 is fastened on the flange 16, in a way described in greater detail hereinafter, and is used as a passage for electromagnetic waves which are reflected or transmitted by a sample into the housing 12. They are analyzed there to ascertain certain properties of the sample. The sensor arrangement 10, as shown in FIG. 2, can be embodied as a near infrared spectrometer, or can be any other optical sensor, for example a camera, a thermometer, or a Raman spectrometer.

Figure 2:
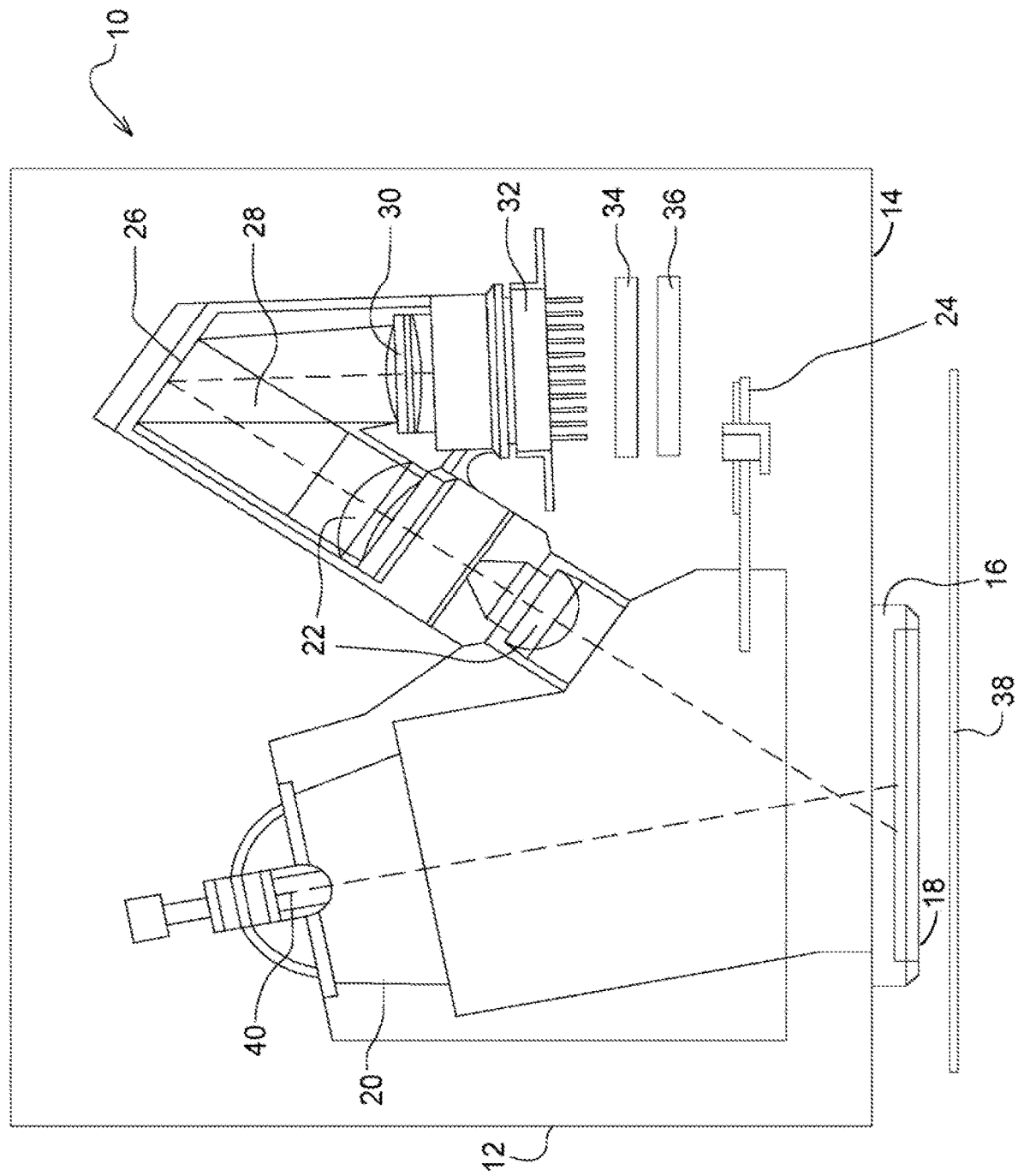
FIG. 2 shows a section through the sensor arrangement of FIG. 1.

FIG. 2 shows a section through the sensor arrangement 10 of FIG. 1, which is suitable for harvesting machines and other machines used for agriculture. The sensor arrangement 10 comprises the housing 12, which is provided on the front plate 14 with the window 18, and in which an illumination source 40, a spectrometer arrangement 28 and at least one standard 24 for internal recalibration are provided. In addition, a processor 34 for recording and processing the measured values and an interface 36 to a bus system are arranged in the housing 12. Quartz glass or sapphire glass is preferably used for the window 18 in the housing 12, through which both the illumination radiation and the radiation reflected from the sample 38 are incident. Sapphire glass enables a sufficiently long service life of the window 18, even in the case of highly abrasive samples 38 (for example sand-containing samples 38). The lamp power of the illumination source 40, which preferably has a reflector 20, can be automatically controllable to adapt the spectrometer arrangement 28 to the various reflection behaviors of greatly varying samples 38.

The spectrometer arrangement 28 consists at least of a dispersion element 26 and a detector (array) 32 and optionally has imaging optical assemblies 22, 30. The interface 36, which is provided in the housing 12, to a bus system is preferably embodied as a wireless or wired connection for data transmission and/or calibration and/or system diagnosis and can support standards, such as CAN, USB, RS232, Wireless LAN, inter alia. However, it is also possible to establish the connection from the sensor arrangement to the bus system via electrical and/or fiber-optic lines. In addition, the processor 34 for recording and processing the measured values is arranged in the housing 12. Both raw data, i.e. the preprocessing of the data on a spectral basis, and calculated results can be produced by this processor 34, which can then be transmitted via the provided interface 36 to a bus system. Moreover, the processor 34 contains the software for the required bus management.

In the sensor arrangement 10, the sample 38 to be measured is irradiated using light from the illumination source 40. The radiation reflected from the sample 38 is absorbed directly by the detector (array) 32 of the spectrometer arrangement 28. On the basis of the intensity distribution of the reflected radiation, different constituents, for example moisture, protein, starch, oil content, and properties such as cut length, fiber state, temperature of the sample can be determined based on calibrations. Both static measurements and measurements of a material flow are possible using the sensor arrangement 10. The sensor arrangement 10 can be used on stationary facilities or any machines in which the harvested material or another sample flows past the measuring head, for example in combine harvesters or forage harvesters or manure tankers, or the measuring head is moved past the harvested material, for example on a swath.

Figure 3:
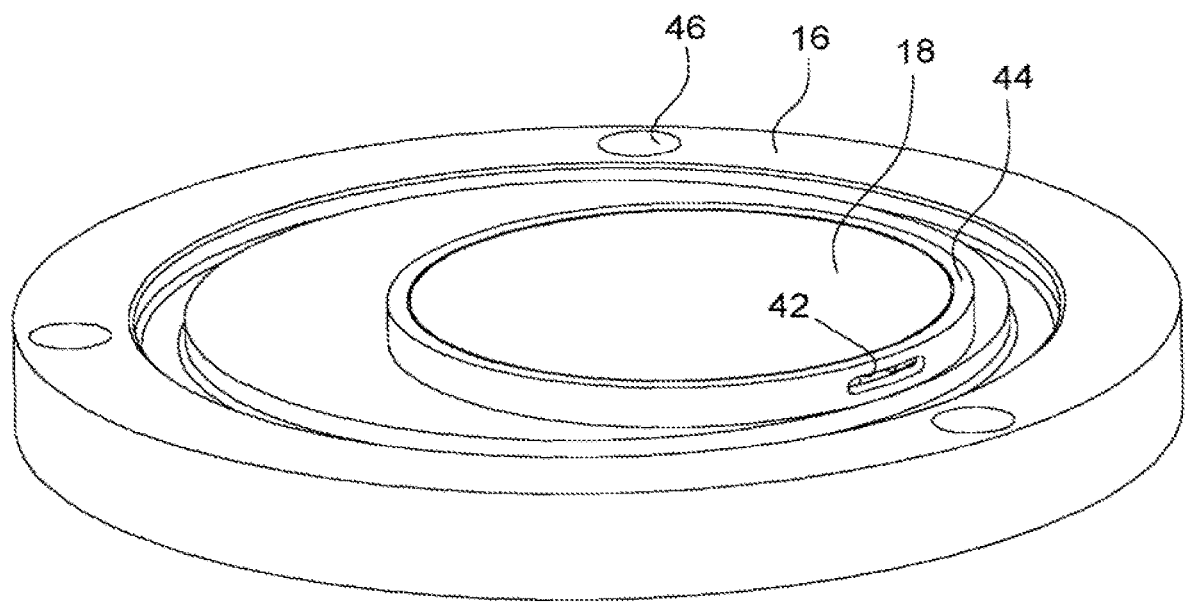
FIG. 3 shows a perspective view of the window of the sensor arrangement having the flange used for its attachment on the housing.
Figure 4:
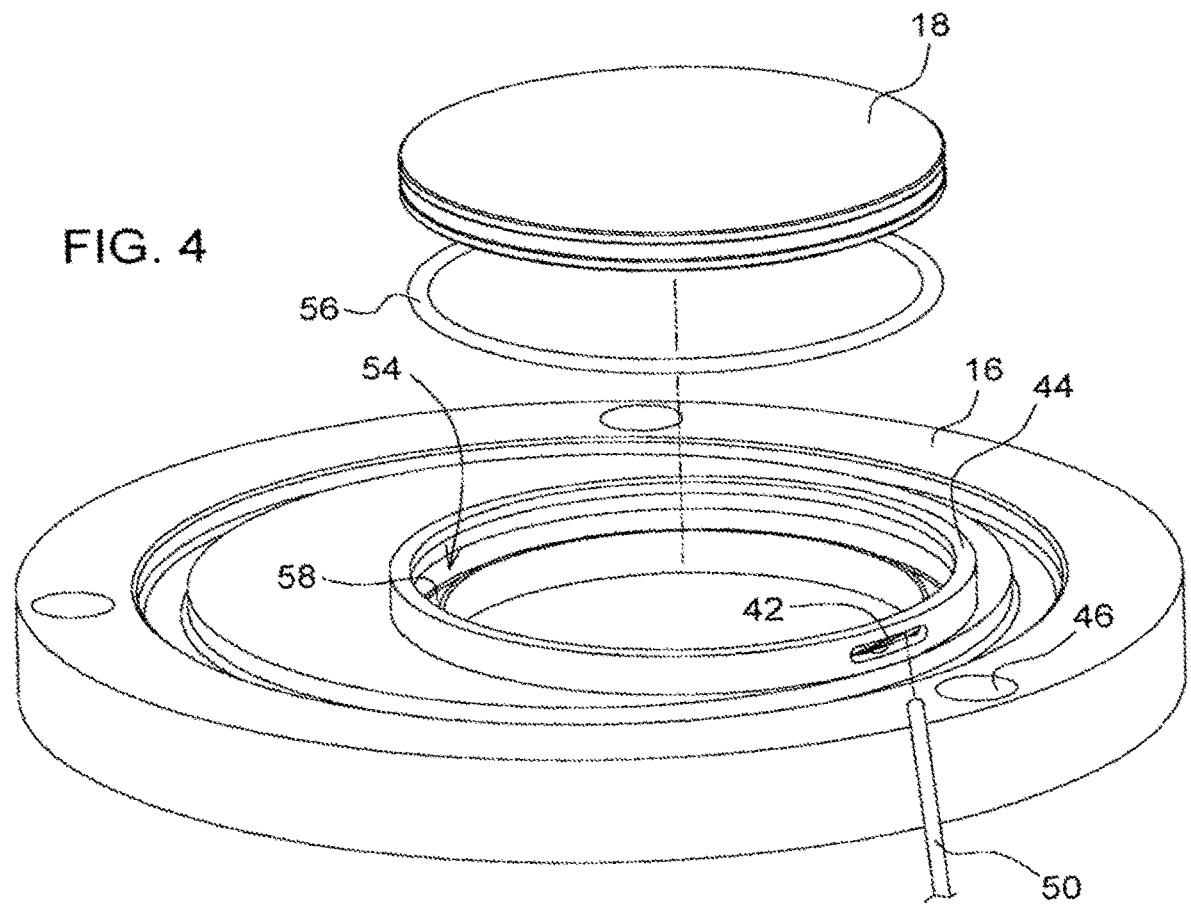
FIG. 4 shows an exploded view of the flange and the window of FIG. 3.
Figure 5:
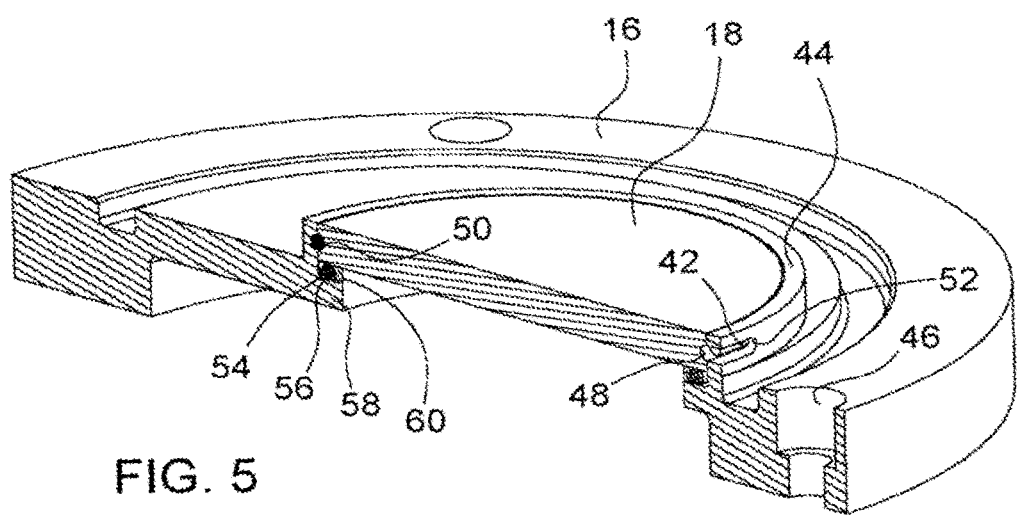
FIG. 5 shows a vertical section through the flange and the window according to FIG. 3.

Reference is now made to FIGS. 3-5, which show the way in which the window 18 is fastened on the flange 16. An outwardly protruding ring 44 is provided on the flange 16 (for example cast on or turned or milled in one piece from solid material or welded on), which completely surrounds the window 18. An oblong hole 42 is provided in the ring 44. Holes 46 extending vertically in relation to the plane of the flange 16 are used to accommodate screws (not shown), which are used to fix the flange 16 on the front plate 14.

The window 18, which is circular in the present example, is equipped on its outer circumference with a groove 48, while the ring 44 also has a groove 52 on the inside. A compression member 50 in the form of a wire 50 (or any other suitable machine element for example in the form of a steel cable or the like or a liquid material introduced into the grooves 48, 52 and curing therein) is pushed or inserted through the oblong hole 44 into the grooves 48, 52 and fixes the window 18 in a form-fitting manner on the ring 44. A ring 58 extending radially inward is arranged on the side of the flange 16 facing toward the housing 12 (for example cast on or turned or milled in one piece from solid material or welded on), which extends radially inward farther than the circumference of the window 18, and has a groove 54 on its side facing toward the window 18, in which a seal element 56 in the form of a closed ring made of flexible material, for example rubber, is inserted. The window 18 compresses the seal element 56 to a certain extent, so that it seals off the interior of the housing 12 in relation to the sample 38.

The window 18 does not necessarily have to be circular, but rather could comprise an edge provided with an arbitrary curvature, the slope of which continuously changes in order to be able to introduce the wire 50. It would also be possible to make the window 18 polygonal and to associate separate wires 50 and grooves 48, 52 with the individual edges.

In light of the foregoing, it is apparent that the compression member 50 fixes the window 18 in cooperation with the grooves 48, 50 in a form-fitting manner on the flange 16 (and thus on the housing 12) and holds the window 18 in relation to the ring 58 in a desired position, so that the window 18 compresses the seal element 56 with a defined force, which effectuates a desired sealing effect of the seal element 56, but does not result in an excessive load of the window 18. The force exerted by the compressed seal element 56 with its upper side adjacent to the window 18 is transmitted via the window 18, the wall of the groove 48, which is adjacent to the seal element 56 and is shown on the bottom in FIG. 4, the wire 50, and the wall of the groove 52, which is adjacent to the sample 38 and is shown on the top in FIG. 4, and the ring 44 to the flange 16, on which the lower side of the seal element 56 is finally supported via the ring 58. Due to this force transfer, it would also be conceivable to have the upper side of the groove 48 and/or the lower side of the groove 52 omitted, i.e. to replace one or both of the grooves 48, 52 with simple projections in the window 18 and in the ring 44. However, the grooves 48, 52 facilitate the insertion of the wire 50, since they provide it with a one-dimensional path along which it is insertable into the grooves 48, 52, which facilitates the installation and prevents tilting of the wire 50.

The tip of the wire 50 can be pointed in order to facilitate the insertion. If the wire is produced from a braid (wire cable or lead), the tip can be adhesively bonded or galvanized in order to avoid fraying.

The window 18 can be pressed downward slightly in the installed state in relation to the normal operating position shown in FIG. 4 by a suitable, additional tool (not shown), in order to relieve the wire 50. The wire 50 can then be pulled out of the oblong hole 44 and the window 18 can be removed after removing the tool, in order to replace it and/or the seal element 56 or maintain them in another way. The assembly takes place in the reverse sequence. Since the wire 50 is visible through the window 18, simple and reliable monitoring of the installation is possible.

An annular projection 60 is formed on the inside of the ring 58 and extends in the direction toward the window 18. The projection 60 forms, together with the ring 58 and the extension of the inner wall of the ring 44 downward, a groove in which the seal element 56 is inserted. Moreover, it forms a stop for the window 18 and prevents the seal element 56 from inadvertently being clamped too strongly by the additional tool mentioned in the preceding paragraph.

It is also to be noted that in FIGS. 2-5, the window 18 is placed from the outside on the flange 16, so that it shields the seal element 56 to the outside in relation to the sample 38. This arrangement could also be reversed, in that the window 18 is attached to the inside of the flange 16, so that then the seal element 56 would be adjacent to the sample 38.

Figure 6:
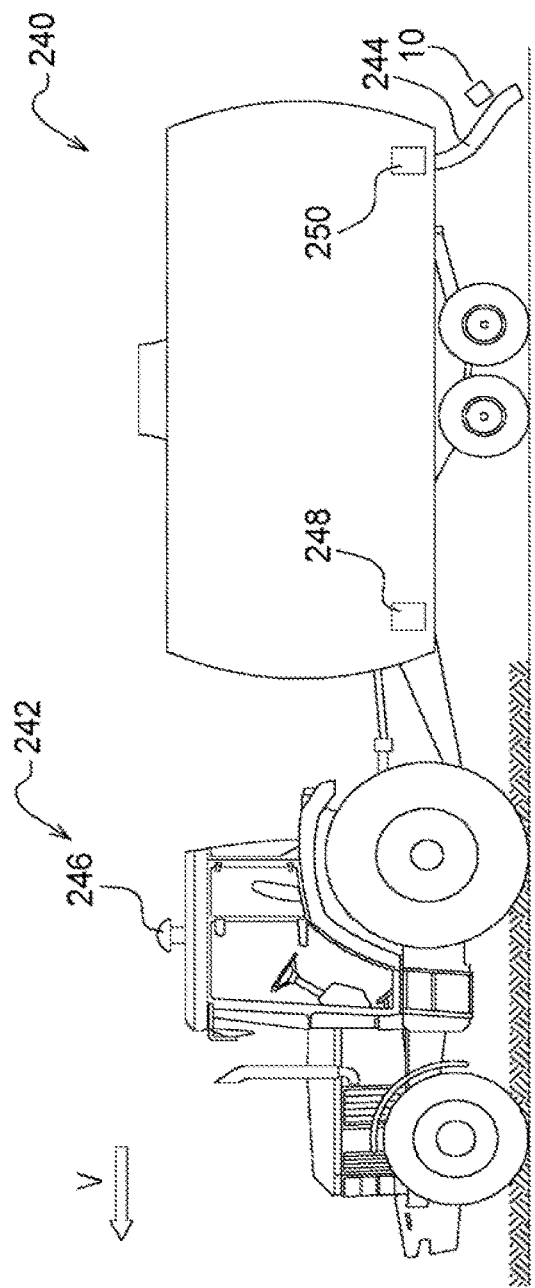
FIG. 6 shows a lateral view of an agricultural work machine in the form of a manure tanker having a sensor arrangement according to FIGS. 1-5.

An agricultural work machine 240 in the form of a manure tanker is shown in FIG. 6, which is pulled by a farm tractor 242 over a field in order to discharge manure through a line 244 onto a field. The output signal of the sensor arrangement 10, which interacts with the manure flowing in the line 244, is supplied to a controller 248, which is moreover connected to a position determination system 246. The controller 248 controls a valve 250, which specifies the flow rate of the manure through the line 244, based on a discharge map stored beforehand in the controller 248, in which it is defined how much constituent (for example nitrogen, potassium, etc.) is to be discharged per unit of area, and on the basis of the output signal in terms of maintaining the values defined in the discharge map.

Figure 7:
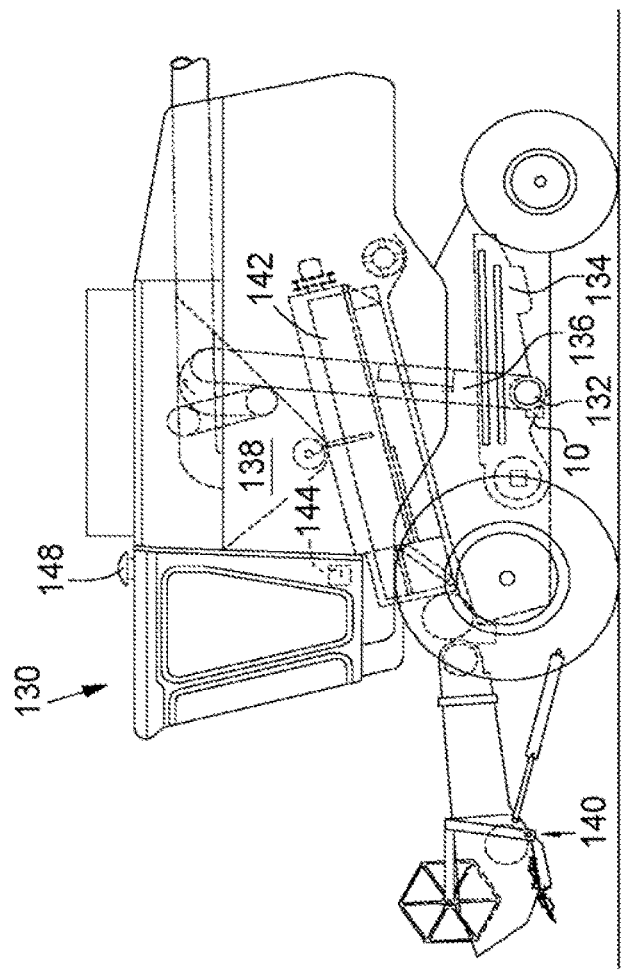
FIG. 7 shows a lateral view of an agricultural work machine in the form of a combine harvester having a sensor arrangement according to FIGS. 1-5.

FIG. 7 shows a further embodiment of a work machine 130 in the form of a self-propelled combine harvester 130, which is equipped with a sensor arrangement 10. The sensor arrangement 10 is attached to the wall of a transverse delivery line 132 and interacts through an opening in the wall with the filtered harvested material (grains), which is delivered by a filtering device 134 and is transferred by the transverse delivery line 132 to a grain elevator 136, which deposits it in a grain tank 138. The filtering unit 134 receives the harvested material from a harvested material receiving unit 140, which supplies it to a threshing and separating unit 142. The sensor arrangement 10 supplies certain constituent specifications such as protein content, starch content, oil content and moisture proportion of the harvested grain, which are stored by a control unit 144 together with an item of position information, which is provided by a receiving antenna 148 of a satellite-based position determination system, in a map.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

Example 1 is a sensor arrangement for evaluating agricultural material, the arrangement comprising:
  a housing having an opening, the opening configured with a window transparent to electromagnetic waves;
  a detector arranged in the housing for detecting electromagnetic waves coming in through the window;
  a flexible seal element disposed between the window and the housing; and
  a compression member proximate at least one of the opening, the housing, the window and the seal element, the compression member configured to press the window against the seal element to seal off the housing.

Example 2 is the sensor arrangement for evaluating agricultural material of any or all previous examples and further comprising the compression member is removable from at least one of the window, the flexible seal element, the opening, and the housing.

Example 3 is the sensor arrangement for evaluating agricultural material of any or all previous examples and further comprising a temporary compression is configured to press the window against the flexible seal element to pretension the window to a slightly greater extent than due to the compression member.

Example 4 is the sensor arrangement for evaluating agricultural material of any or all previous examples and further comprising a temporary compression member is configured to pretension the window against the flexible seal element to allow for easier removal of the compression member.

Example 5 is the sensor arrangement for evaluating agricultural material of any or all previous examples and further comprising the compression member bears on at least one of the surface of the window and the circumference of the window in a spaced relationship from the flexible seal element.

Example 6 is the sensor arrangement for evaluating agricultural material of any or all previous examples and further comprising the compression member interacts with a feature formed on the circumference of the window.

Example 7 is the sensor arrangement for evaluating agricultural material of any or all previous examples and further comprising the feature formed on the circumference of the window is at least one of a groove and a projection.

Example 8 is the sensor arrangement for evaluating agricultural material of any or all previous examples and further comprising the compression member interacts in a form-fitting manner with a feature of the housing.

Example 9 is the sensor arrangement for evaluating agricultural material of any or all previous examples and further comprising the feature of the housing is at least one of a groove and a projection.

Example 10 is the sensor arrangement for evaluating agricultural material of any or all previous examples and further comprising the compression member is at least one of a wire and a cable.

Example 11 is a sensor arrangement for agricultural applications, the arrangement comprising:
  a housing having an opening, the opening configured with a window transparent to electromagnetic waves;
  a detector arranged in the housing for detecting electromagnetic waves coming in through the window;
  a flexible seal element disposed between the window and the housing;
  a compression member proximate at least one of the opening, the housing, the window and the seal element, the compression member configured to press the window against the seal element to seal off the housing; and
  a temporary compression member proximate at least one of the opening, the window and the seal element, the temporary compression member configured to pretension the window against the seal element to seal off the housing.

Example 12 is the sensor arrangement for evaluating agricultural material of any or all previous examples and further comprising the compression member is form-fitting and removable from its position proximate at least one of the window, the flexible seal element, the opening, and the housing for cleaning or repair.

Example 13 is the sensor arrangement for evaluating agricultural material of any or all previous examples and further comprising The sensor arrangement of claim 10 wherein the temporary compression member is removable from its position proximate at least one of the window, the flexible seal element, the opening, and the housing for cleaning or repair.

The invention claimed is:

1. A sensor arrangement for evaluating agricultural material, the sensor arrangement comprising:
  a housing having an opening, the opening configured with a window transparent to electromagnetic waves, the window including a circumferential groove;
  a detector arranged in the housing for detecting the electromagnetic waves coming in through the window;
  a flexible seal element disposed between the window and the housing; and
  a compression member in the circumferential groove of the window, the compression member configured to press the window against the flexible seal element to seal off the housing.

2. The sensor arrangement of claim 1 wherein the compression member is form-fitting and removable from a position proximate at least one of the window, the flexible seal element, the opening, or the housing.

3. A sensor arrangement for evaluating agricultural material, the sensor arrangement comprising:
- a housing having an opening, the opening configured with a window transparent to electromagnetic waves;
- a detector arranged in the housing for detecting the electromagnetic waves coming in through the window;
- a flexible seal element disposed between the window and the housing; and a compression member proximate at least one of the opening, the housing, the window or the flexible seal element, the compression member configured to press the window against the flexible seal element to seal off the housing, wherein the compression member is form-fitting and removable from its position proximate at least one of the window, the flexible seal element, the opening, or the housing, wherein a temporary compression member is configured to press the window against the flexible seal element to pretension the window to a greater extent than due to the compression member.

4. The sensor arrangement of claim 3 wherein the temporary compression member is configured to pretension the window against the flexible seal element to allow for easier removal of the compression member.

5. The sensor arrangement of claim 3 wherein the compression member bears on at least one of a surface of the window or a circumference of the window and is spaced apart from the flexible seal element.

6. The sensor arrangement of claim 5 wherein the compression member interacts with a feature formed on the circumference of the window.

7. The sensor arrangement of claim 6 wherein the feature formed on the circumference of the window is at least one of a groove or a projection.

8. The sensor arrangement of claim 3 wherein the compression member interacts in a form-fitting manner with a feature of the housing.

9. The sensor arrangement of claim 8 wherein the feature of the housing is at least one of a groove or a projection.

10. The sensor arrangement of claim 8 wherein the compression member is at least one of a wire or a cable.

11. The sensor arrangement of claim 10 wherein the compression member is form-fitting and removable from its position proximate at least one of the window, the flexible seal element, the opening, or the housing for cleaning or repair.

12. The sensor arrangement of claim 10 wherein the temporary compression member is removable from its position proximate at least one of the window, the flexible seal element, the opening, or the housing for cleaning or repair.

13. A sensor arrangement for evaluating agricultural material, the sensor arrangement comprising:
- a housing having an opening, the opening configured with a window transparent to electromagnetic waves;
- a detector arranged in the housing for detecting the electromagnetic waves coming in through the window;
- a flexible seal element disposed between the window and the housing;
- a compression member proximate at least one of the housing, the opening, the window or the flexible seal element, the compression member configured to press the window against the flexible seal element to seal off the housing; and
- a temporary compression member proximate at least one of the opening, the window or the flexible seal element, the temporary compression member configured to pretension the window against the flexible seal element to seal off the housing.

* * * * *

UNITED STATES PATENT AND TRADEMARK OFFICE
CERTIFICATE OF CORRECTION

PATENT NO. : 11,486,824 B2  
APPLICATION NO. : 17/302513  
DATED : November 1, 2022  
INVENTOR(S) : Haiges et al.

Page 1 of 1

It is certified that error appears in the above-identified patent and that said Letters Patent is hereby corrected as shown below:

On the Title Page

Item (72), under "Inventors", delete "Dirk Jung, Zweibrâœken (DE)" and insert --Dirk Jung, Zweibrücken (DE)"--.

Signed and Sealed this  
Twenty-fifth Day of June, 2024

Katherine Kelly Vidal  
*Director of the United States Patent and Trademark Office*